(12) United States Patent
Hamaide et al.

(10) Patent No.: US 6,408,114 B1
(45) Date of Patent: Jun. 18, 2002

(54) METHOD OF STABILIZATION OPTICAL SOLITONS, AND EQUIPMENT FOR IMPLEMENTING THE METHOD

(75) Inventors: Jean-Pierre Hamaide, St Germain les Arpajon; Frédéric Neddam, Montreuil, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/481,905

(22) Filed: Jan. 12, 2000

(30) Foreign Application Priority Data

Jan. 18, 1999 (FR) .............................. 99 00436

(51) Int. Cl.⁷ .............................. G02B 6/00; H01S 3/00
(52) U.S. Cl. .......................... 385/27; 385/122; 359/341
(58) Field of Search ................ 385/1, 38, 27, 385/122, 123; 359/341

(56) References Cited

U.S. PATENT DOCUMENTS 5,532,861 A * 7/1996 Pirio et al. .................. 359/161
6,141,129 A * 10/2000 Mamyshev ................ 359/176
6,201,621 B1 * 3/2001 Desurvire et al. .......... 359/158

FOREIGN PATENT DOCUMENTS

EP 0 862 286 A1 9/1998

OTHER PUBLICATIONS

Smith N. J. et al.: "Gordon–Haus Jitter Reduction in Enhanced Power Soliton Systems" Conference on Optical Fiber Communications, Dallas, Feb. 16–21, 1997, Feb. 16, 1997, p. 309, XP000776473 Institute of Electrical and Electronics Engineers ISBN: 0–7803–3860–X.

* cited by examiner

*Primary Examiner*—Brian Healy
*Assistant Examiner*—Sarah N. Song
(74) *Attorney, Agent, or Firm*—Sughrue Mion, PLLC

(57) ABSTRACT

The invention relates to a method of stabilizing managed optical solitons propagating in a dispersion-managed optical fiber transmission line, said method being characterized in that the following are performed periodically along the transmission line for each managed optical soliton: a first step consisting in establishing coupling that is substantially linear between the energy and the spectrum width of the optical soliton; and a second step consisting in setting the spectrum width by filtering, and, by means of the substantially linear coupling, in setting the energy of the soliton resulting from the first step, the center frequency of the filtering being substantially equal to the center frequency of the optical soliton.

13 Claims, 2 Drawing Sheets

METHOD OF STABILIZATION OPTICAL SOLITONS, AND EQUIPMENT FOR IMPLEMENTING THE METHOD

BACKGROUND OF THE INVENTION

The present invention relates to optical fiber telecommunications and more particularly to long-distance optical fiber telecommunications using soliton signals and wavelength division multiplexing (WDM).

The transmission of soliton pulses or solitons along a portion of an optical fiber having abnormal dispersion is a known phenomenon. Solitons are pulse signals of the $\text{sech}^2$ waveform. With that type of pulse, the non-linearity in the corresponding portion of the fiber compensates for the dispersion of the optical signal, i.e. the dependence of the refractive index on the intensity of the optical signal is counterbalanced by the chromatic dispersion and vice versa. The transmission of the solitons is modelled in known manner by the non-linear Schrödinger equation.

Various effects limit the transmission of such pulses, such as the jitter induced by the solitons interacting with the noise present in the transmission system, as described, for example in the article by J. P. Gordon and H. A. Haus, Optical Letters, vol. 11 n DEG 10 pages 665–667. That effect, referred to as the "Gordon-Haus effect", imposes a theoretical limit on the quality or the data rate of soliton transmission.

In order to exceed that limit, it is possible to use synchronous modulation of the solitons, by means of semiconductor modulators. That technique intrinsically limits the data rate of the soliton link because of the complexity and of the upper limit of the passband of the semiconductor modulators.

Another solution for exceeding the above-mentioned transmission limit consists in feeding solitons into an optical fiber transmission line in which dispersion is managed. That technique is described, for example, in the article by N. J. Smith et al. "Soliton transmission using periodic dispersion compensation" published in the "Journal of Lightwave Technology", Vol. 15, No. 10, October 1997. In such a dispersion-managed line, alternating segments of optical fiber respectively have normal dispersion and abnormal dispersion. The transmission line thus has low mean dispersion for which there exists a soliton-type pulse whose characteristics (duration, chirp, etc.) vary periodically. Such solitons that propagate in a dispersion-managed transmission line are also referred to as "managed solitons". Compared with a conventional soliton propagating in a line whose dispersion is not managed, a managed soliton offers the advantage that it can have higher energy, which makes it possible to increase considerably the total propagation distance. Furthermore, the dispersion management technique advantageously makes it possible to reduce non-linear effects, in particular in WDM transmission lines, such as, for example, cross phase modulation (XPM) or four-wave mixing (FWM).

In order to exceed the theoretical limit of transmission lines in which dispersion is not managed, it has also been proposed to use sliding guiding filters making it possible to control the jitter of the transmitted solitons, see, for example, EP-A-0 576 208. In that configuration, the transmission line is made opaque to noise while it is transparent to the soliton.

It might be thought that combining the dispersion-management technique with sliding guiding filters would make it possible to push back the transmission limits even further.

SUMMARY OF THE INVENTION

However, the Applicant has found, through digital simulations, that the opposite occurs. The use of sliding guiding filters in a dispersion-managed transmission line gives rise to amplitude fluctuations and time jitter that are considerable, which is unacceptable for a reliable optical fiber transmission system. Instead of improving transmission, said transmission is degraded considerably.

Furthermore, in order to increase the data rate of optical fiber transmission systems using soliton signals, it has also been proposed to use wavelength division multiplexing (WDM).

Wavelength division multiplexing, referred to as WDM below, consists in combining a plurality of modulated channels in the same fiber, each of the channels having a different carrier wavelength. Thus, the overall data rate of a transmission line is equal to the sum of the data rates of the various channels.

The present invention proposes a method and equipment for implementing the method that make it possible to push back further the transmission limit of the transmission technique using dispersion-managed optical fiber.

To this end, the invention provides a method of stabilizing managed optical solitons propagating in a dispersion-managed optical fiber transmission line, said method being characterized in that the following are performed periodically along the transmission line for each managed optical soliton:

a first step consisting in establishing coupling that is substantially linear between the energy and the spectrum width of the optical soliton; and a second step consisting in setting the spectrum width by filtering, and, by means of the substantially linear coupling, in setting the energy of the soliton resulting from the first step, the center frequency of the filtering being substantially equal to the center frequency of the optical soliton.

The method of the invention may also have one or more of the following characteristics:

during the first step, each managed optical soliton is converted into a pure Schrödinger soliton by amplifying it and by feeding it into an optical fiber having dispersion matched to the amplitude of the amplified soliton, thereby establishing coupling that is substantially linear between the energy and the spectrum width of the optical soliton;

during the first step, each managed optical soliton is amplified and then fed into a fiber that is highly non-linear compared with the transmission line, and that is not very dispersive, the energy of the amplified solitons being sufficient to cause non-linear optical Kerr effects when the amplified solitons propagate in said fiber that is highly non linear and not very dispersive, thereby establishing coupling that is substantially linear between the energy and the spectrum width of the optical soliton;

for managed solitons with chirp, after the second step, a third step is performed that consists in re-establishing the chirp of the optical soliton as it was before the first step; and when the optical transmission line is a WDM optical fiber line, and when each managed optical soliton propagates in an associated channel of a plurality of multiplexed channels, a demultiplexing step is performed prior to said first step, and a multiplexing step is performed after said last step of the method, and the steps of the method are performed on each channel individually.

The invention also provides equipment for implementing the method as defined above, said equipment being characterized in that it comprises:

first means for establishing coupling that is substantially linear between the energy and the spectrum width of the optical soliton; and second means for setting the spectrum width by filtering, and, by means of the substantially linear coupling, for setting the energy of the soliton at the outlet of the first means, the center frequency of the filtering being substantially equal to the center frequency of the optical soliton.

The equipment of the invention may also have one or more of the following characteristics:

the first means for establishing coupling that is substantially linear between the energy and the spectrum width of the optical soliton comprise, disposed in line, an amplifier and an optical fiber having dispersion matched to the amplitude of the optical soliton so as to convert said soliton into a pure Schrödinger soliton;

the first means for establishing coupling that is substantially linear between the energy and the spectrum width of the optical soliton comprise, disposed in line, an amplifier and a fiber that is highly non-linear compared with the transmission line, and that is not very dispersive, the energy of the amplified solitons being sufficient to cause non-linear optical Kerr effects when the amplified solitons propagate in said fiber that is highly non linear and not very dispersive;

for managed solitons with chirp, downstream from said second means, the equipment further comprises third means for re-establishing the chirp of the optical soliton as it was upstream from said first means; and when the optical transmission line is a WDM optical fiber line, and when each managed optical soliton propagates in an associated channel of a plurality of multiplexed channels, the equipment further comprises demultiplexing means disposed upstream from said first means, and multiplexing means disposed downstream from said second means or from said third means.

Other characteristics and advantages of the invention appear from the following description given by way of non-limiting example and with reference to the accompanying drawings, in which:

BRIEF DESCRIPTION OF THE DRAWINGS

FIG. 1 is a diagram summarizing a WDM optical fiber data transmission system 1.

DETAILED DESCRIPTION OF THE INVENTION

This system 1 comprises the following disposed in line: an optical emitter E for emitting wavelength division multiplexed optical signals, a first driver optical amplifier 5, an optical fiber transmission line 7 for transmitting the multiplexed optical signals, and an optical receiver R.

The emitter E comprises a plurality of optical sources 8A suitable for emitting optical signals having respective wavelengths $\lambda_1, \lambda_2, \ldots \lambda_N$ (where N is any natural number), each signal thus defining a transmission channel with a carrier of associated wavelength, and a multiplexer M for feeding optical signals into the transmission line 7.

In symmetrical manner, the optical receiver R comprises a demultiplexer D and a plurality of detectors 8B suitable for receiving the optical signals of respective wavelengths $\lambda_1, \lambda_2, \ldots \lambda_N$.

The transmission line 7 is made up of legs TF of a dispersion-managed transmission optical fiber. Each leg TF is made up, for example, of segments of two types of fiber: an optical fiber having normal dispersion, e.g. of $D_1$=4.68 ps/nm.km and an optical fiber having abnormal dispersion, e.g. of $D_2$=–4.52 ps/nm.km. For example, these segments are 50 km in length and are disposed in alternation in each leg. Thus, mean dispersion of <D>=0.078 ps/nm.km is obtained for each leg TF. For information on how the dispersion-managed legs of fiber TF operate, reference may be made to the above-mentioned article by N. J. Smith et al.

Stabilizer equipment 9 for stabilizing the managed optical solitons is disposed between successive legs TF.

Naturally, it is also possible to make provision to dispose such equipment once only or at a few chosen locations along the line 7. Preferably, in particular if provision is made for soliton stabilization of the invention to be performed once only, provision is made to dispose stabilizer equipment at the end of the transmission line.

Figure 1:
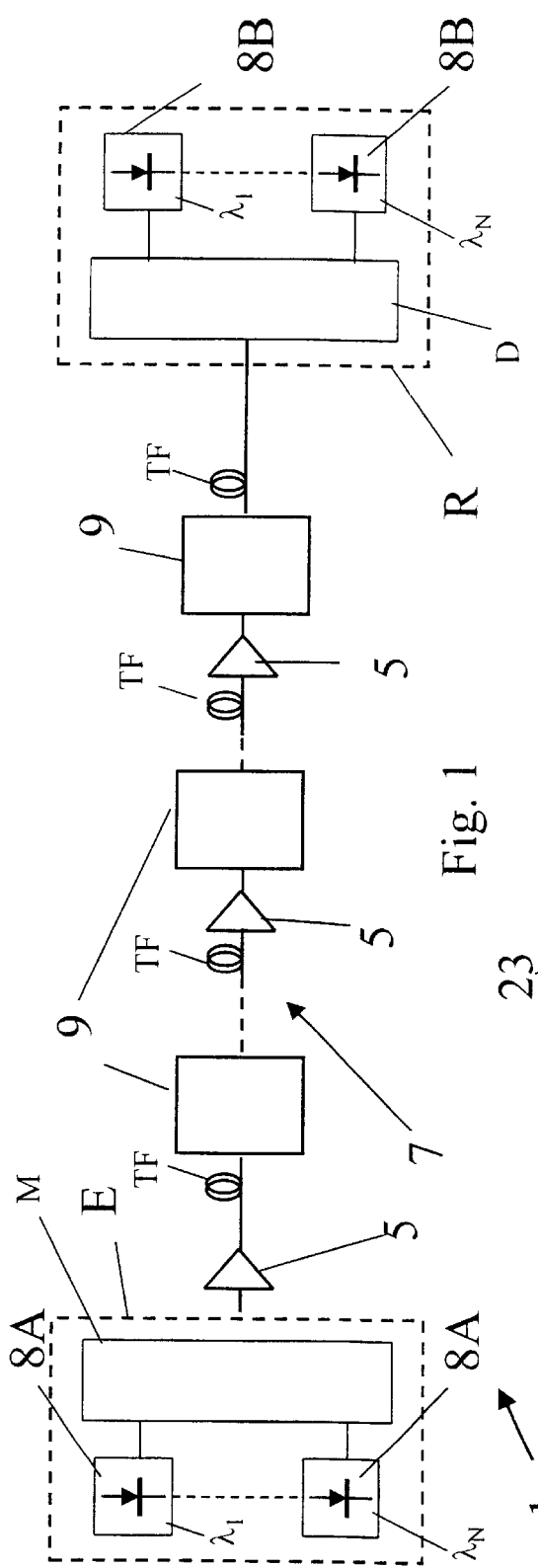
FIG. 1 is a diagram summarizing an optical fiber data transmission system implementing the method of the invention.
Figure 2:
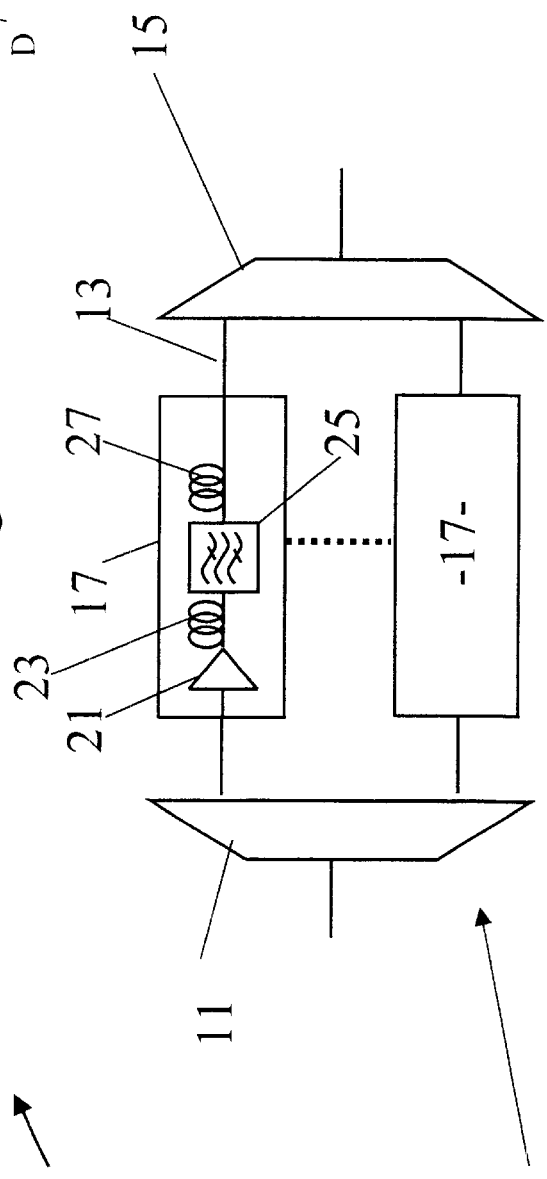
FIG. 2 is a diagram summarizing a first embodiment of stabilizer equipment of the invention.

Reference is made below to FIG. 2 which is a more detailed diagram summarizing a first embodiment of the equipment 9.

The dispersion-managed optical soliton stabilizer equipment 9 comprises a demultiplexer 11 having one inlet and N outlets, a set of N optical fiber lines 13 in parallel corresponding to the N transmission channels, and a multiplexer 15 having N inlets and one outlet.

A stabilizer unit 17 is disposed in each of the optical fiber lines 13. The stabilizer unit comprises the following in line: a first optical amplifier 21, e.g. of the erbium-doped fiber amplifier (EDFA) type, and a first piece of fiber 23 having dispersion matched to the amplitude of the amplified soliton at the outlet of the amplifier 21 so that the solitons propagating along said piece are transformed into pure Schrödinger solitons. Coupling that is substantially linear is thus established between the energy and the spectrum width of the optical soliton.

Preferably, the first piece of fiber 23 has length greater than the soliton period which is the distance over which the phase of the soliton varies through $\pi/2$.

Downstream from the piece of fiber 23, there are disposed a guiding filter 25 and optionally a second piece of fiber 27 making it possible to re-establish the chirp of the soliton signal as it was upstream from the unit 17.

The center frequency of the guiding filter 25 is substantially equal to the center frequency of the solitons propagating in the channel in question.

Figure 3:
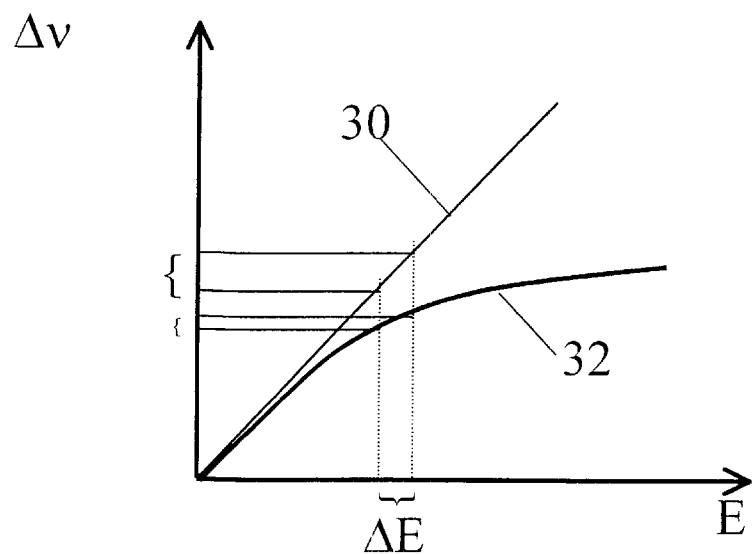
FIG. 3 is a graph showing how a first variant of the method of the invention operates.

With reference to FIG. 3, an explanation is given below of how the method of the invention makes it possible to stabilize managed optical solitons.

The graph in FIG. 3 diagrammatically shows the relationship between the energy of the solitons and their spectrum width. For solitons propagating under Schrödinger soliton or pure soliton conditions, the relationship between the energy of the solitons and their spectrum width is a linear relationship, as shown by a straight line 30.

In contrast, for managed solitons or mean solitons, this relationship is a curve 32 which curves away from the straight line as the energy increases. Because of this curved shape, filtering a managed soliton by means of a guiding filter does not make it possible to achieve effective stabilization of the soliton in terms both of frequency and of energy. For high soliton energy values, a ΔE for a given total soliton energy corresponds to a soliton spectrum width ΔΔv that becomes smaller and smaller, whereas, for solitons propagating under Schrödinger conditions, regardless of the energy of the soliton, the ΔE for a given total soliton energy always corresponds to the same soliton spectrum width Δv.

That is why, in a first embodiment of the invention, the dispersion-managed optical signals are converted into pure Schrödinger solitons by being optically amplified in the amplifier 21 and by being fed into the optical fiber 23 which has matched dispersion suitable for making it possible for the amplified solitons to be converted into Schrödinger solitons. Thus, coupling is achieved that is substantially linear between the energy and the spectrum width of the optical soliton.

After filtering, the wavelength of the soliton is brought back towards the center of the filter. By means of its corpuscular properties, the soliton is preserved, and its spectrum recovers its theoretical shape during propagation. In addition, the amplitude of the soliton is stabilized because of the proportionality between ΔE and Δv for pure solitons.

Figure 4:
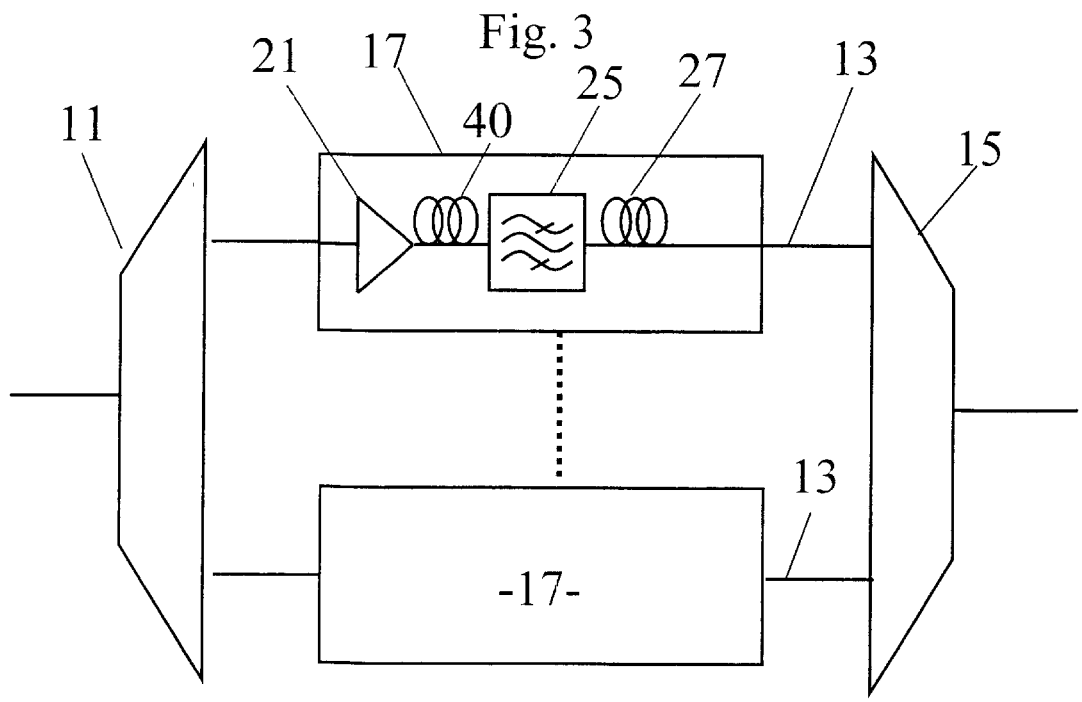
FIG. 4 is a view identical to the FIG. 2 view, showing a second embodiment of stabilizer equipment of the invention.

Reference is made below to FIG. 4 which shows a more detailed summary diagram of a second embodiment of the equipment 9. Elements identical to those of FIG. 2 carry the same reference numerals.

The equipment 9 of FIG. 4 differs from the equipment of FIG. 2 in that the first piece of fiber 23 which has dispersion matched to the amplified soliton conditions is replaced with a first piece of fiber 40 having high non-linearities compared with the legs TF of fiber, i.e. a high Kerr effect, and low dispersion, i.e. dispersion that is almost zero or normal.

In this embodiment, the dispersion-managed solitons are amplified in the amplifier 21, and they are then fed into the first piece of fiber 40 which is highly non-linear. By means of the non-linear effects and more particularly by means of the phase self-modulation, the spectra of all of the solitons are widened in the piece of fiber 40. The higher the energy of the soliton fed into the portion 40, the more its spectrum is widened. Coupling that is substantially linear is thus established between the energy and the spectrum width of the optical soliton.

Then, during filtering in the filter 25, the solitons are energy stabilized and frequency stabilized by a saturation effect. The length of the piece of fiber 40 and the width of the filter 25 are preferably chosen so that even those solitons which have low energy at the inlet of the piece 40 are widened to beyond the width of the filter 25. But since the solitons of higher energy are also spectrally widened in the non-linear piece of fiber 40 to a greater extent than are the solitons of lower energy, the higher-energy solitons are also affected by the filtering, in particular in the extremities, to a greater extent than are the lower-energy solitons. Therefore, the frequency and the energy of the solitons are stabilized.

As can be observed, the method of the invention and the equipment for implementing the method make it possible effectively and with a small number of components to stabilize the frequency and the energy of the solitons propagating in a dispersion-managed WDM transmission line, which makes it possible to obtain a data transmission rate that is higher than in transmission lines known from the state of the art.

What is claimed is:

1. A method of stabilizing managed optical solitons propagating in a dispersion-managed optical fiber transmission line (7), in which method the following are performed once or more than once along the transmission line (7) for each managed optical soliton:

a first step consisting in establishing coupling that is substantially linear between the energy and the spectrum width of the optical soliton by amplifying the managed optical soliton and feeding it into a fiber (40) having non-linear effects; and a second step consisting in setting the spectrum width by filtering, and, by means of the substantially linear coupling, in setting the energy of the soliton resulting from the first step, the center frequency of the filtering being substantially equal to the center frequency of the optical soliton, said method being characterized in that, in the first step, all of the solitons are spectrally widened in said fiber (40) having non-linear effects.

2. A method according to claim 1, characterized in that the length of said fiber (40) having non-linear effects and the filtering width are chosen such that even low-energy solitons are widened to beyond the filtering width.

3. A method according to claim 1, characterized in that said fiber (40) having non-linear effects is highly non-linear compared with the transmission line (7), and is not very dispersive.

4. A method according to claim 1, characterized in that said fiber (40) having non-linear effects has dispersion that is almost zero or normal.

5. A method according to claim 1, for managed solitons with chirp, said method being characterized in that, after said second step, a third step is performed that consists in re-establishing the chirp of the optical soliton as it was before the first step.

6. A method according to claim 1, in which the optical transmission line (7) is a WDM optical fiber line, and in which each managed optical soliton propagates in an associated channel of a plurality of multiplexed channels, said method being characterized in that a demultiplexing step is performed prior to said first step, and a multiplexing step is performed after said last step of the method, and in that the steps of the method are performed on each channel individually.

7. A method according to claim 1, characterized in that the steps of the method are performed periodically along the transmission line (7).

8. Equipment for stabilizing managed optical solitons propagating along a dispersion-managed optical fiber transmission line (7), said equipment comprising:

an amplifier (21) and a fiber (40) having non-linear effects, the amplifier and the fiber being disposed in line, so as to establish coupling that is substantially linear between the energy and the spectrum width of the optical soliton by amplifying the managed optical soliton and feeding it into the fiber (40) having non-linear effects; and filtering means (25) for setting the spectrum width by filtering, and, by means of the substantially linear coupling, for setting the energy of the soliton at the outlet of the first means, the center frequency of the filtering being substantially equal to the center frequency of the optical soliton, said equipment being characterized in that the fiber (40) having non-linear effects is chosen such that it spectrally widens all of the solitons.

9. Equipment according to claim 8, characterized in that the length of the fiber (40) and the filtering width of the filtering means (25) are chosen such that even low-energy solitons are widened to beyond the filtering width.

10. Equipment according to claim 8, characterized in that said fiber (40) is highly non-linear compared with the transmission line (7), and is not very dispersive.

11. Equipment according to claim 8, characterized in that said fiber (40) having non-linear effects has dispersion that is almost zero or normal.

12. Equipment according to claim 8, for managed solitons with chirp, said equipment being characterized in that, downstream from said filtering means (25) it further comprises means (27) for re-establishing the chirp of the optical soliton as it was upstream from said amplifier (21).

13. Equipment according to claim 8, in which the optical transmission line (7) is a WDM optical fiber line, and in which each managed optical soliton propagates in an associated channel of a plurality of multiplexed channels, said equipment being characterized in that it further comprises demultiplexing means (11) disposed upstream from said amplifier (21) and multiplexing means (15) disposed downstream from the filtering means (25) or from the means (27) for re-establishing the chirp.

* * * * *